Jan. 19, 1954 A. J. PEREYRA 2,666,399
MACHINE FOR FORMING TORTILLAS AND THE LIKE
Filed March 25, 1949 5 Sheets-Sheet 1
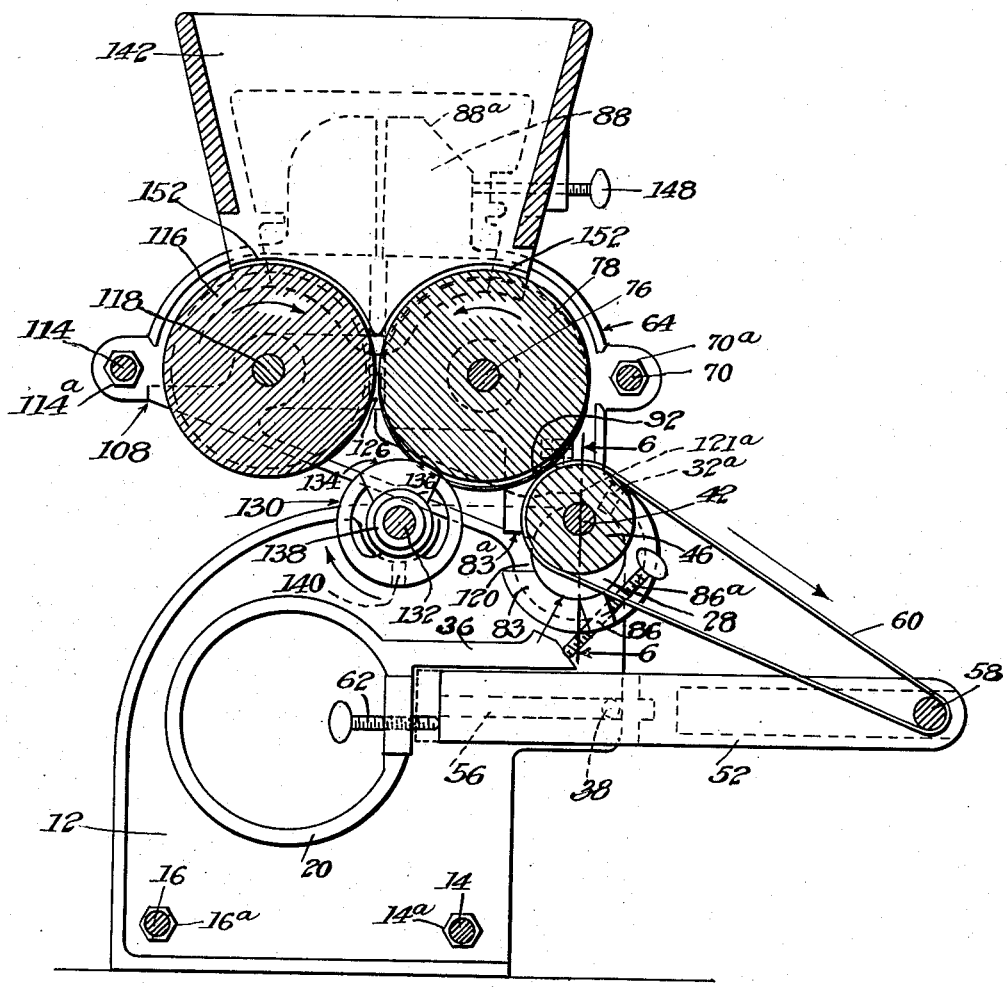
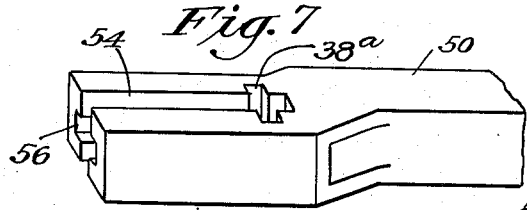
INVENTOR:
Armando J. Pereyra,
BY
Alan Franklin,
ATTORNEY.

Jan. 19, 1954         A. J. PEREYRA         2,666,399
MACHINE FOR FORMING TORTILLAS AND THE LIKE
Filed March 25, 1949         5 Sheets-Sheet 2
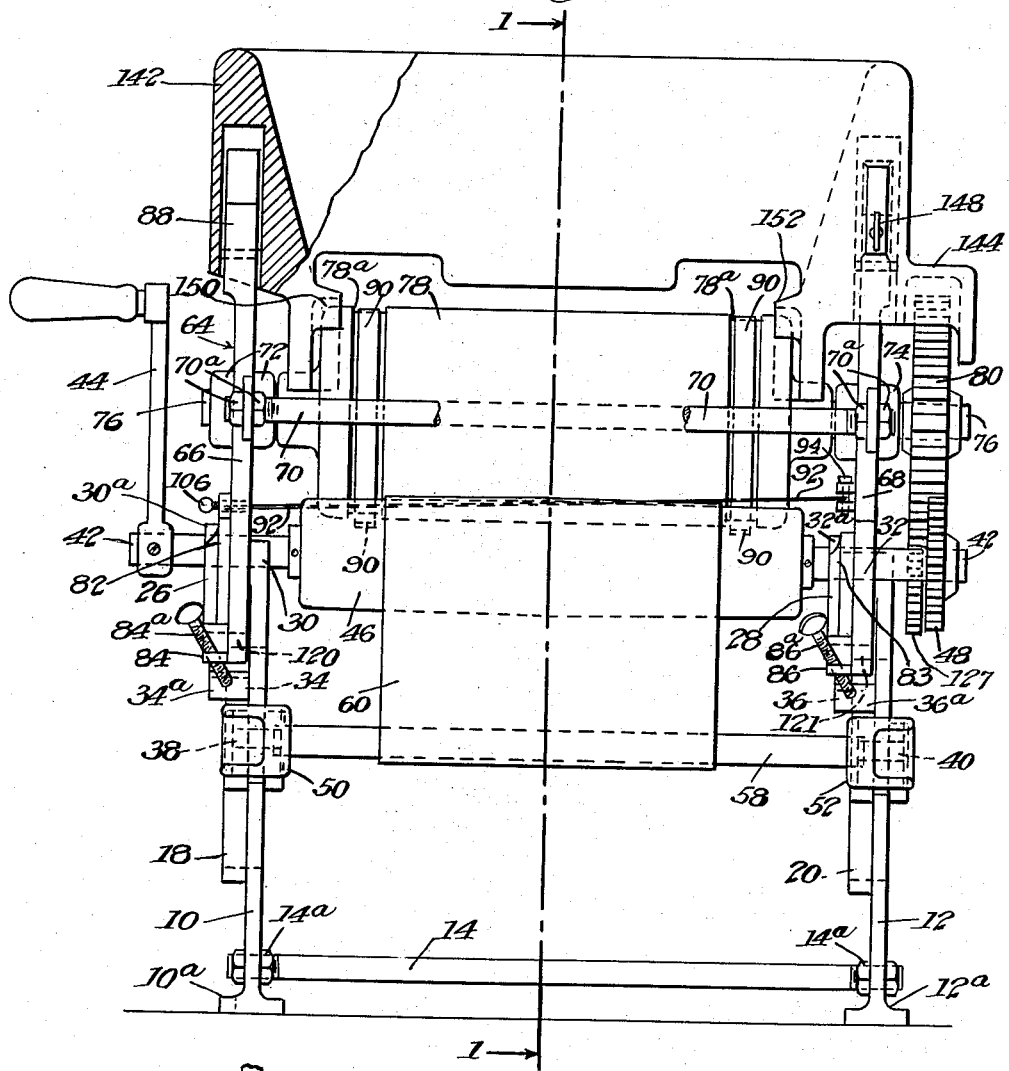
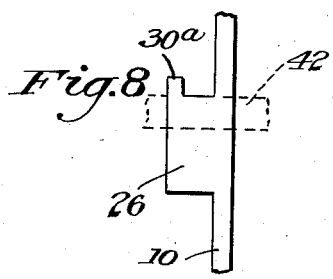
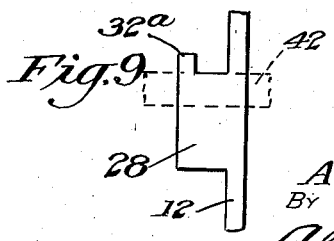
INVENTOR:
Armando J. Pereyra,
BY
Alan Franklin,
ATTORNEY.

Jan. 19, 1954     A. J. PEREYRA     2,666,399
MACHINE FOR FORMING TORTILLAS AND THE LIKE
Filed March 25, 1949     5 Sheets-Sheet 3
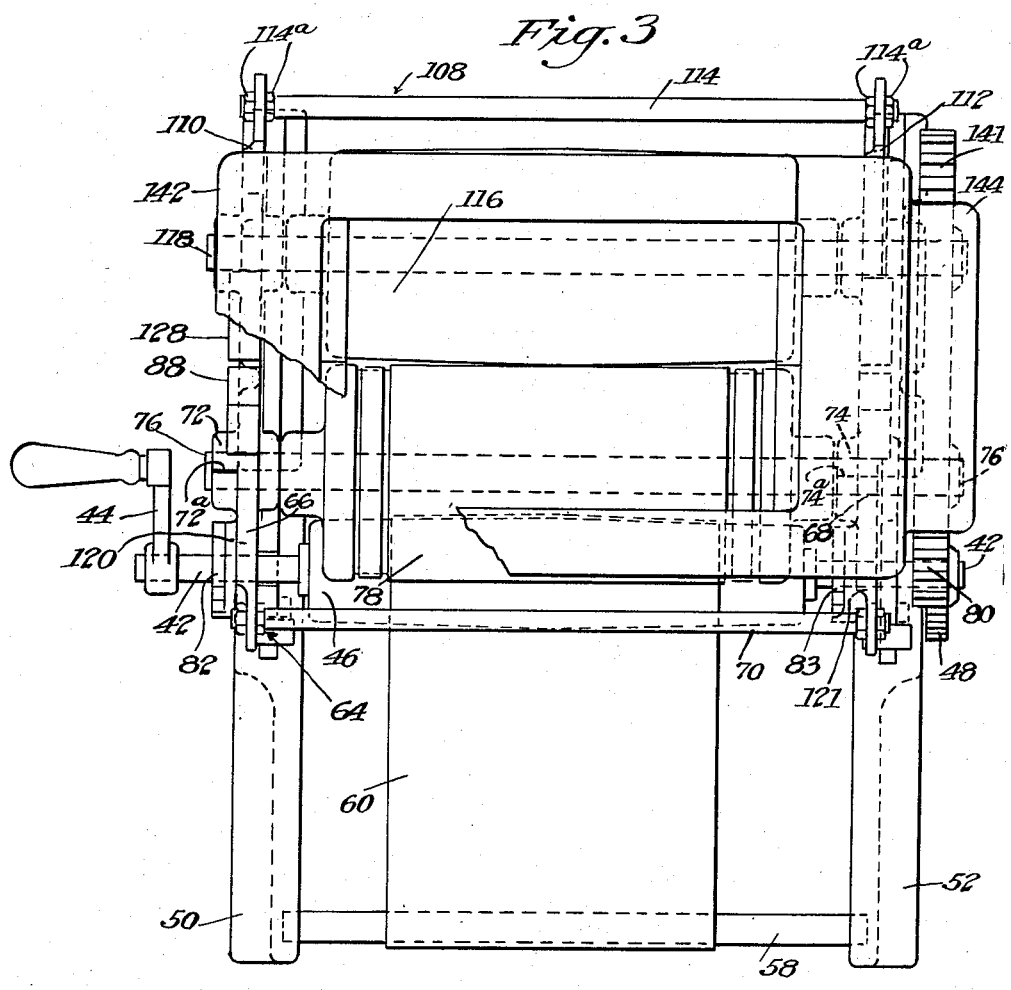
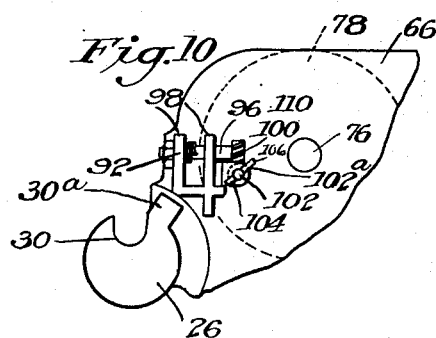
INVENTOR:
Armando J. Pereyra,
By Alan Franklin,
ATTORNEY.

Jan. 19, 1954 A. J. PEREYRA 2,666,399
MACHINE FOR FORMING TORTILLAS AND THE LIKE
Filed March 25, 1949 5 Sheets-Sheet 4
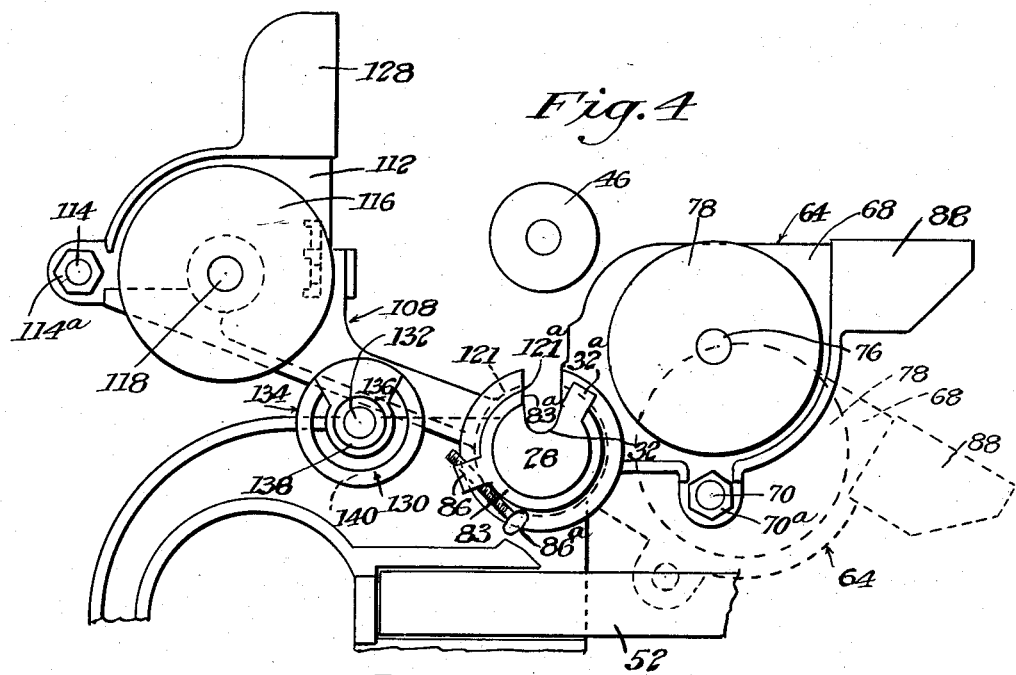
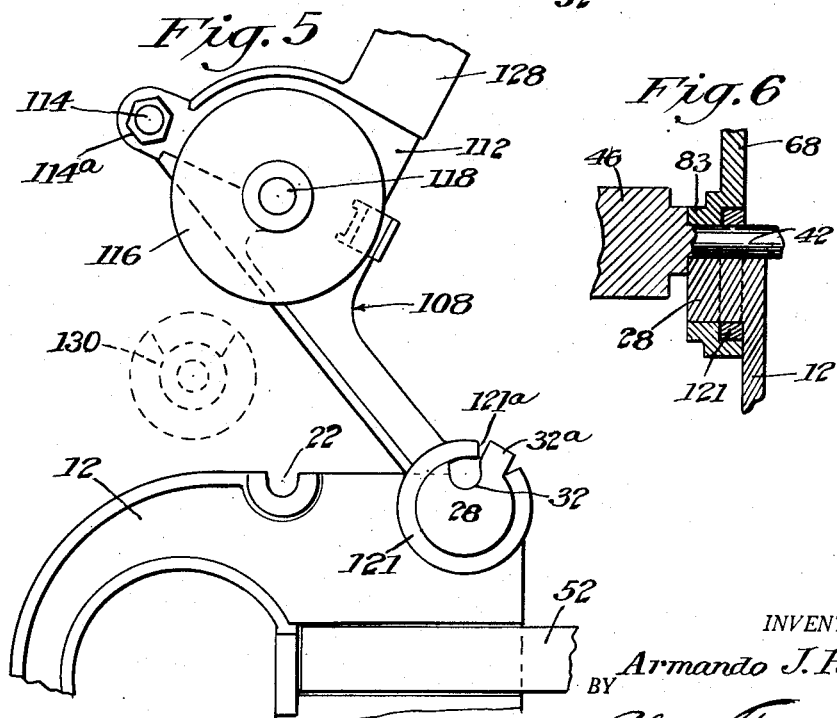
INVENTOR:
Armando J. Pereyra,
BY Alan Franklin,
ATTORNEY.

Jan. 19, 1954

A. J. PEREYRA 2,666,399

MACHINE FOR FORMING TORTILLAS AND THE LIKE

Filed March 25, 1949

*INVENTOR*
Armando J. Pereyra

BY *Alan Franklin,*
ATTORNEY

Patented Jan. 19, 1954

2,666,399

UNITED STATES PATENT OFFICE 2,666,399

MACHINE FOR FORMING TORTILLAS AND THE LIKE

Armando J. Pereyra, Bremerton, Wash.

Application March 25, 1949, Serial No. 83,342

9 Claims. (Cl. 107—12)

This invention relates to dough rolling and cutting machines, and more particularly to an improved machine for rolling dough out flat and cutting the rolled dough into suitable shape for producing tortillas, pan cakes and the like.

The general object of the invention is to provide a dough rolling and cutting machine of the character stated which may be readily broken down for cleaning or repairing the same, or set up in position for use, without the use of tools.

A more particular object is to provide a dough rolling and cutting machine of the character stated including a pair of roller supporting frames fulcrumed on a common center, and constructed and arranged to be swung on said fulcrum to permit (a) ready removal and replacement of the dough cutter, (b) easy breakdown or setting up of the machine without the use of tools, (c) full access to the dough stripper elements for replacement thereof, (d) easy removal of the discharge conveyor belt for cleaning or replacement thereof, and (e) spring action by the co-acting dough roller against the dough cutter.

Another object is to provide a dough rolling and cutting machine of the character stated including an improved hopper unit constructed and arranged to serve (a) as the hopper for the dough, (b) as a gear cover, (c) as an adjusting means for controlling the thickness of the rolled dough, (d) as a means for permitting prompt release and separation of the dough rollers in an emergency, and (e) as a means for maintaining as desired the same adjustment of the thickness of the rolled dough.

A further object is to provide a dough rolling and cutting machine of the character stated including improved conveyor belt roller supporting arms for permitting prompt breakdown of the belt assembly without the use of tools for cleaning or replacement of the belt, and permitting ready adjustment of the belt tension or alignment of the belt.

Other objects and advantages will appear hereinafter as the specification progresses.

The presently preferred embodiment of my invention is illustrated in the annexed drawings, which form a part of this specification, and in which:

Fig. 1 is a transverse vertical section of my invention taken on line 1—1 of Fig. 2.

Fig. 2 is a front elevation of my invention partly broken away to show certain features of construction.

Fig. 3 is a top plan view of the machine of my invention.

Fig. 4 is a fragmentary side elevation of my invention with the dough hopper together with the left-hand frame (as seen in Fig. 3) removed, and showing the front dough roller frame (and dough rollers) swung apart to permit removal of the upper conveyor roller, which is shown removed from the machine.

Fig. 5 is a view similar to Fig. 4 but with the front dough roller frame and dough roller removed from the machine and the back dough roller frame and dough roller swung into their unlocked position to be removed from the machine, and to permit removal of the cutter roller, which is shown in dotted lines lifted from the machine.

Fig. 6 is a longitudinal section of the fulcrum bearing of the dough roller frames and upper conveyor roller bearing, taken on line 6—6 of Fig. 1, and showing said frames and upper conveyor roller locked together in their normal operative positions.

Fig. 7 is a perspective view of the butt end of one of the arms supporting one end of a delivery belt.

Fig. 8 is a fragmentary detail view of a bearing boss on one side of the machine base, and Fig. 9 is a similar view of a corresponding boss on the opposite side of the base on which front and back roller frames are journalled. Fig. 10 is a fragmentary detail showing stripper wire tensioning means mounted on the left side (as seen in Fig. 2) of the front roller frame.

Figure 11:
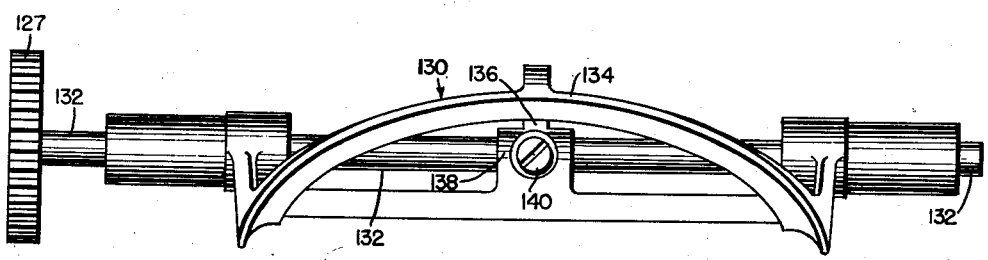
Figure 12:
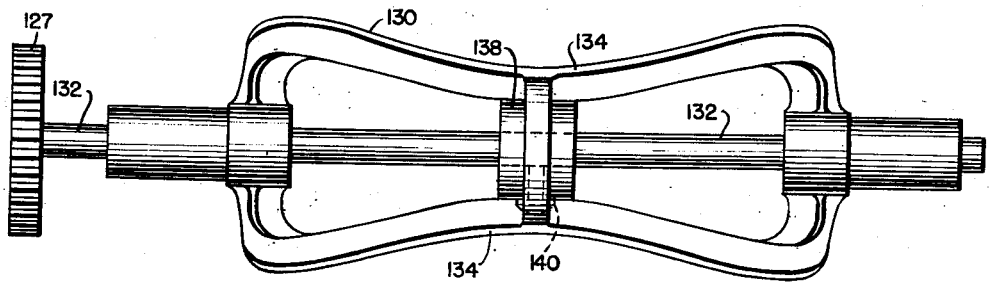
Figure 13:
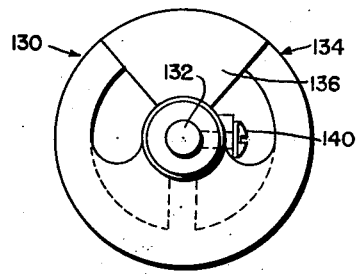

Figs. 11–13 inclusive are side elevation, plan and end elevation views, respectively, of the cutter.

In the drawings the numeral 10 indicates the left hand base side plate and 12 the right hand base side plate of the machine. As shown in Fig. 2 each side plate is provided with a wide peripheral flange 10a and 12a around the rear and lower edge, the latter portion of the flanges affording footing for the side plates. The plates are assembled to form a base by being held spaced in parallel alignment by a front tie rod 14 and rear tie rod 16, the rods being threaded at their ends and having nuts 14a, 16a threaded thereon gripping the side walls between them.

The base plates are of identical arrangement, each having a central opening surrounded by a flange 18 and 20 respectively projecting to the left (as seen in Fig. 2), bearing recesses 22 in the top edge of the plates, and with bearing bosses 26, 28 projecting to the left. The bearing bosses are slotted downwards for a distance to provide bearings 30, 32. The outer surfaces of bosses 26, 28 form journal bearings for parts, later described, which are removably held against sideways displacement by radially projecting lugs 30a, 32a positioned at the outer side of the bosses. On the left face of each plate (as seen in Fig. 2) horizontal ridges 34, 36 are provided terminating in end faces 34a, 36a, and oppositely extending lugs 38, 40 are provided at the forward edge of the plates at a lower level than the ridges. The operating shaft 42 is supported in the bearing recesses 30, 32 in each of the bosses. While the shaft may be rotated by power, I have shown a hand crank 44 mounted on one end of the shaft by which the shaft 42 may be turned by the operator. On shaft 42 a roller 46 is secured between the end plates in any suitable manner, and a driving gear 48 is pinned or otherwise secured to the other end of the shaft which projects beyond the side plate 12. It will be noted that shaft 42 is held in the bearing recesses 30 and 32 only by the cooperation of removable parts later described. A pair of arms 50, 52 are fitted to the side plates and project forwardly. The arms are each slotted in a vertical direction as indicated at 54 in Fig. 7 and the inner walls of the slot channeled as shown at 56. The vertical slot 54 is designed to enable the butt end of the arms to fit closely on the forward part of the side walls, and channels 56 fit closely over laterally projecting lugs 38 and 40, which are admitted through vertical channels 38a. When pushed home the butt end of the arms is held against vertical movement by engagement of the portion of each arm extending between the lugs and under surface of projecting ridges 34, 36. The forward ends of the arms are drilled to receive the ends of a length of rod 58. A conveyor belt 60 is mounted on roller 46 which is preferably tapered from its center toward its ends to center the belt and rod 58. Belt 60 is, therefore, rotated by rotation of crank 44. If preferred a roller may be mounted on rod 58 to carry the forward end of the conveyor belt. The arms 50, 52 are moved forwardly to tension the belt 60 by thumb screws 62 working in threaded bores in the flanges 18 and 20 with their heads in the openings in the side plates and their ends engaging against the ends of the arms. The action of the screws will force the arms forward slightly as shown in Fig. 1, thus moving the vertical channels 38a out of alignment with lugs 38 and 40.

A front roller frame, generally indicated at 64, is journalled on bosses 26, 28 in the manner hereinafter described. The frame comprises two side plates 66, 68 held rigidly in parallel relation by a tie and spacing bar 70, the ends of which are threaded to receive nuts 70a clamping the front frame side plates between them. Bosses 72, 74 are cast with the plates 66, 68 and drilled to provide bearings for a shaft 76 on which a front roll 78 is secured for rotation between the side plates 66, 68. Preferably, the bosses are slotted vertically as indicated at 72a and 74a to enable the shaft to be oiled. The right hand end of shaft 76 projects beyond the side plate 68 and a wide-faced gear 80 is secured on the projecting end of the shaft and meshes with gear 48 on driving shaft 42.

The side plates of the front frame 64 are extended downwardly to provide open supporting rings or bearings 82, 83 adapted to fit over the periphery of bosses 26, 28 projecting from the base plates. The bearings 82 and 83 are slotted as indicated at 83a (Figs. 1 and 4) to enable them to be slid sideways onto the bosses, the slots 83a enabling lugs 30a, 32a to be passed with the front frame 64 tilted forwardly but when the front frame is raised to operative position the lugs 30a, 32a, will prevent the frame from moving off the bearing bosses 26, 28.

The open supporting rings 82, 83 are also provided with projecting lugs 84, 86 drilled and threaded to receive thumb screws 84a, 86a which when screwed inwardly will abut the surfaces 34a, 36a at the forward ends of the horizontal projecting ridges 34, 36 on the base side plates and hold the front frame in operative position. When thumb screws 84a, 86a, which serve to lock the frame 64 in operating position, are slackened back, the front frame may be rotated forwardly. When tightened against members 34 and 36 the tension of the front roller against the cutter 130 may be set. The side plates of the front frame 64 are provided with upward extensions 88, the purpose of which will be later explained.

The front roll 78 is provided with wide but shallow peripheral grooves 78a toward each end and rings 90 of strip material are mounted loosely in the grooves but are held in position by the walls of the grooves. A dough loosening and product removing wire 92 is arranged under tension to lie against the face of the front roller as shown in Figs. 1 and 2, the wire passing under rings 90. The wire is secured at one end by a clamp, or as shown in Fig. 10, by being attached to a pin 94 carried on brackets secured to side plate 68 and tensioned by a shaft 96 drilled to receive the other end of the wire and mounted in flanges 98 projecting outwardly from plate 66 of the front frame. A pinion gear 100 is mounted on the shaft. A worm shaft 102 is mounted on a small bracket 104 secured to the flange 98, the worm 102a on shaft 102 meshing with the pinion gear, and is provided with a key 106 (Fig. 2) by which the shaft 102 and shaft 96 may be rotated to tension the wire 92, the setting being retained because of the irreversible characteristic of a worm and pinion drive.

Thumb screws 84a, 86a control the position of the front roller only, locking it in position against the cutter and permitting adjustment of the tension of this roller against the cutter. The position of the rear roller is controlled by the adjusting screws 148 on the hopper which when tightened draw the rear roller frame, by the engagement of the hopper therewith, and rear roller closer to the front roller. The rear roller remains otherwise free to rotate backward for a distance of about one inch away from the front roller when the hopper is lifted or the adjusting screws 148 are slackened.

A rear roller frame generally indicated at 108 is arranged similarly to the front roller frame comprising side plates 110 and 112 held in spaced parallel relation by a tie and spacing bar 114 provided with threaded ends on which are mounted nuts 114a clamping the side plates between them. A back roller 116 is secured to a shaft 118 mounted in bearing bosses cast on the side plates. The plates 110, 112 are extended downwardly and provided with annular bearings 120 (Fig. 3), 121 (Fig. 5) similar to the bearings of the front frame and also fitting on the bearing bosses 26, 28 side by side with the front frame bearings. Bearings 120, 121 are slotted radially, as indicated at 121a (Fig. 5), to enable the bearings to be pushed sideways onto the bosses past lugs 30a and 32a. A back roller scraper wire 126 is held under tension against the forward face of the roller by mounting and tensioning means similar to those shown for the front roller scraper wire and therefore it is not thought necessary to illustrate said means. A gear 141 is fixed on the end of the shaft projecting through the right-hand side (as seen in Fig. 3) of the back roller frame. This gear meshes with gear 80 on front roller shaft 76 when in operating position. The rear roller frame is provided with upward extensions 128 for a purpose later explained.

A rotary cutter generally indicated at 130 is mounted on a shaft 132 supported in bearings 22 and retained therein when the machine is in operative position by engagement with front roll 78 (which bears against the cutter) with a pressure which is effective to hold the shaft 132 seated in bearings 22. While I may of course arrange the rotary cutter to which I lay no claim per se as a roller with raised cutting or dough dividing ridges projecting from the periphery thereof, I prefer to form the cutter as an accurate casting consisting of the cutting element 134 supported by arm 136 extending from bushing 138 secured to the shaft 132 by set screw 140. The form of the cutting edge of element 134 is of course that of a circle bent so that all points thereof are equidistant from the axis of shaft 132. A gear 127 is secured to the right-hand end (as seen in Fig. 2) of shaft 132 which projects beyond side plate 12 of the base and meshes with gear 80 on front roller shaft 76. The construction of a typical cutter is shown in Romero, 1,763,445, Fig. 3.

A dough hopper 142 is arranged to serve several purposes besides its primary use of holding dough in position over rollers 78 and 116, as will appear.

The hopper may be formed as a single casting with inwardly sloping walls and with the sides curved to cover the edges of the rollers. A lateral extension or hood 144 is arranged at one side to protect the gearing driving the rotating parts of the machine.

In the wall of the hopper facing the upward projections 88 of the front roller frame, thumb screws 148 are mounted in threaded holes drilled through the wall and the ends of the thumb screws are brought into engagement with the upward extensions 88 to adjust the spacing between the front and back rolls. The hopper 142 is mounted without any restraining means on the machine, the weight of the hopper being taken by the top surface ends of front roller 78 and back roller 116 by means of the hopper bearing ribs 150 and 152. The described construction and arrangement of the hopper enables it to be removed merely by lifting the forward end upwardly so that the ends of screws 148 slip off the vertical face of upward extensions 88 which are sloped sharply away from the vertical faces of the extensions, toward their upper ends as indicated at 88a, Figure 1 whereupon the back roller frame is free to move away from the front roller frame by backward rotation of the back roller frame about the bearing bosses 26, 28 to the extent permitted by the distance between the lower edges of back roller frame 108 and shaft 132 in recess 22. It will be evident that the instant release of pressure between the rollers obtained by thus elevating the ends of thumb screws 148 into the cutaways 88a of the upward projections 88 provides an important safety feature enabling the rollers to be released from any object caught therein which otherwise might be dragged between the rollers and cause damage to the machine.

*Operation*

Assuming that it is desired to make Mexican tortillas, which are flat thin cakes, the front roller is locked in position against the cutter and the tension between the two adjusted by turning the locking screws 84a, 86a, the distance between the front and back rollers is adjusted by turning screws 148 after which a batch of mixed dough is placed in the hopper and when the crank 44 is turned, the dough will be drawn between the front and back rollers. The usual stripping device in the embodiment shown, a wire tensioned across the face of the back roller, is effective to detach the dough from that roller immediately after passing the narrowest part of the opening between the rollers but the dough will cling to the face of the front roller. The dough on the front roller, which is in contact with the rotary cutting device, is cut out into circular pieces which are freed from the front roller by the scraper wire 92 arranged under tension and located just before the belt roller 46 and will be deposited on the conveyor belt by gravity. The uncut dough adheres to the flat rings at each side of the front roller since wire 92 passes between the rings 90 and roller 78 and therefore does not separate the dough from the face of the rings and the adhesion of the dough thereto is sufficient to carry the uncut dough back to the hopper. The front and back walls of the hopper, as will be seen from Fig. 1, are somewhat spaced from the top of the rollers. The tension of the stripper wires may be readily adjusted from the exterior of the machine by the mechanism described, while should a wire require replacement this can be effected very quickly by removing the dough hopper, releasing the locking thumb screws 84a, 86a, and swinging the front roller frame forwardly to replace the back roller stripper wire, while the front roller stripper wire may be replaced without disturbing the machine. Should any foreign object be caught between the rollers, it can be immediately released by giving the front of the dough hopper an upward and backward blow which will free it from the upstanding ears of the front roller frames which will enable the back roller to drop away from the front roller.

Thumb screws 84a and 86a, when screwed inward, bear against the ends of horizontal ridges 34 and 36, respectively, to produce a forward displacement of the lower end of the front frame 64, and backward displacement of the upper part of frame 64, by rotating side plates 66 and 68 on bearing bosses 26 and 28. By screwing thumb screws 84a and 86a inward, front roll 78 mounted in the upper part of frame 64 is made to bear against the cutter roller 130 and pressure of front roll 78 against the cutter roller 130 may be graduated. A necessary spring action or "give" between front roll 78 and the cutter roller 130 is provided because force is exerted by the thumb screws on the short arm of a lever, represented by the lower ends of side plates 66 and 68, and the force is transmitted through the somewhat elastic side frames and applied at the long end of the lever represented by the distance between the point of contact of the front roll with the cutter roller 130 and the bearing bosses 26 and 28 which act as the fulcrum for this lever action.

A further effect of tightening thumb screws 84a and 86a is to securely hold frame 64 in operating position upon base side plates 10 and 12 since the cutter roller prevents movement of the front roller and front frame in one direction while the thumb screws prevent movement of the front roller and front frame in the opposite direction.

After use, the machine may be completely taken down by first lifting the hopper off the machine and then slacking back screws 62 to loosen the conveyor belt; the belt arms 50, 52 may then be pushed back toward the rims 16 bringing the vertical slots 36a opposite the supporting lugs 38 which permits the arms to be dropped downwardly over the lugs, thus releasing the arms from the base side plates 10, 12. The belt shaft 56 may then be removed from the arms by lateral displacement and the shaft withdrawn from the belt leaving the latter free around the belt roller 46. Locking thumb screws 84a, 86a are then slackened back to clear abutments 34a, 36a, whereupon frame 64 may be rotated forward to bring the gaps in the annular bearings of side plates 66, 68 into line with the slots in bearings 30, 32. The gaps in annular bearings 120, 121 of back frame side plates 110, 112 having been brought into line with the slots in bearings 30, 32 after removal of the hopper, the belt roller shaft 42 may be lifted out vertically carrying with it the belt roller, the belt, belt roller gear and hand crank. This is the position of the parts shown in full lines in Fig. 4. Frame 64 is then rotated further forward to bring the annular gaps of frames 66, 68 into line with the radial studs 30a, 32a and the frame 64 removed intact with front roller and front roller gear by sliding the frame sideways off the bearing bosses 26, 28. The rear roller frame 108 is then similarly removed by rotating it forward to bring the annular gaps in bearings 120, 121 into line with the radial studs 30a, 32a and then sliding the frames sideways off the bearing bosses carrying with them the rear roller and rear roller gear. The cutter 130 together with its shaft and gear may then be lifted off frames 10, 12. All parts of the machine thus become available for washing, cleaning and drying separately.

It is evident that when the cutter alone needs to be removed for replacement by a different size cutter, this may be accomplished without complete disassembly of the machine by simply slackening back the locking thumb screws 84a, 86a to clear abutments 34a, 36a, whereupon frames 64, 108 may be rotated forward away from the cutter sufficiently to permit the cutter shaft to be lifted vertically out of the bearing slots 22 and removed backward together with the attached cutter and cutter gear.

The machine as designed is intended to be used with or without a belt. In the latter case, the belt arms, belt, and belt shaft 56 may be dispensed with.

While I have particularly described and illustrated a preferred form of machine of my invention, it is to be understood that various modifications therein or changes and rearrangements of parts may be made by those skilled in the art without departing from the scope of the invention as intended to be defined by the appended claims.

I claim:

1. A machine for forming tortillas and the like including: a base having aligned bearings therein open for a portion of their periphery; a rotary cutter member supported in said bearings; a first dough roller mounting means having a frame removably mounted on said base and a first dough roller mounted in said frame; a second dough roller mounting means having a frame removably mounted on said base and a second dough roller mounted in said second frame and cooperating with the first dough roller to roll out a sheet of dough and bearing against the cutting element of the cutter member and retaining the latter in its bearings; a second pair of aligned bearings in said base; a drive shaft mounted in said second pair of bearings and retained therein by engagement with said second frame while the latter is in operative position; means for driving said cutter member and first and second rolls at predetermined speed from said drive shaft and a dough hopper positioned over and bearing against said frames to hold them toward one another, said hopper being free of attachment to the base and the frames and vertically removable from position, removal of the hopper enabling all elements of the machine to be disassembled without the use of tools.

2. A machine for forming tortillas and the like including: a base having aligned bearings therein open for a portion of their periphery; a rotary cutter member supported in said bearings; a first dough roller mounting means having a frame removably mounted on said base and a first dough roller mounted in said frame; a second dough roller mounting means having a frame removably mounted on said base and a second dough roller mounted in said second frame and cooperating with the first dough roller to roll out a sheet of dough and bearing against the cutting element of the cutter member and retaining the latter in its bearings; a second pair of aligned bearings in said base; a drive shaft mounted in said second pair of bearings and retained therein by engagement with said second frame while the latter is in operative position; means for driving said cutter member and first and second rolls at predetermined speed from said drive shaft, said shaft being arranged below the first dough roller; a belt roller secured to said drive shaft; arms projecting from said base; a belt roller mounted in the projecting ends of said arms; an endless conveyor belt running over said belt rollers; and a dough hopper positioned over and bearing against said frames to hold them toward one another, said hopper being free of attachment to the base and the frames and vertically removable from position, removal of the hopper enabling all elements of the machine to be disassembled without the use of tools.

3. A machine for forming tortillas and the like including: a base having vertical side plates extending in parallel relation, aligned bearing recesses provided in the top edges of the plates; aligned bearing bosses projecting laterally from said plates in the same direction, aligned bearing grooves being provided in the upper surfaces of said bosses and being open adjacent the top edge of the plates; a rotary cutting element supported in the bearing recesses in the top edges of the plates; a back roller frame having spaced side plates; a back roller mounted in said spaced side plates; annular bearings in said back roller frame side plates fitting upon the periphery of said bosses; a front roller frame having spaced side plates; a front roller supported in the front frame in operative engagement with the cutting element and being effective to prevent the cutter from leaving its bearings, the back and front rollers co-operating to roll out a sheet of dough and the cutting element dividing the sheet of dough while supported on the front roller; annular bearings in the front roller frame side plates fitting on the periphery of said bosses in side by side relation with the annular bearings of the back frame; a drive shaft mounted below said front roller in the bearing grooves in the bosses and retained therein by the annular bearings of the front and back roller frames, means for rotating said drive shaft; and gearing driven by said shaft to rotate said cutter and rollers; and a dough hopper free from attachment to the base and the roller side frames engaging over the side frames to hold them in operative position and when removed enabling the machine to be readily disassembled by sliding the annular bearings of the roller frames off the bosses and lifting the cutting member and drive shaft out of their bearings.

4. A machine for forming tortillas and the like including: a base having vertical side plates extending in parallel relation, aligned bearing recesses provided in the top edges of the plates; aligned bearing bosses projecting laterally from said plates in the same direction, aligned bearing grooves being provided in the upper surfaces of said bosses and being open adjacent the top edge of the plates; a rotary cutting element supported in the bearing recesses in the top edges of the plates; a back roller frame having spaced side plates; a back roller mounted in said spaced side plates; annular bearings in said back roller frame side plates fitting upon the periphery of said bosses; a front roller frame having spaced side plates; a front roller supported in the front frame in operative engagement with the cutting element, the back and front rollers co-operating to roll out a sheet of dough and the cutting element dividing the sheet of dough while supported on the front roller; annular bearings in the front roller frame side plates fitting on the periphery of said bosses in side by side relation with the annular bearings of the back frame; a drive shaft mounted below said front roller in the bearing grooves in the bosses and retained therein by the annular bearings of the front and back roller frames, a belt roller secured to and driven by the drive shaft; arms detachably and adjustably mounted on said base; a cylindrical member mounted between the projecting ends of the arms; an endless conveyor belt riding on said belt roller and cylindrical member; means for rotating said drive shaft; gearing driven by said shaft and effective to rotate said cutter and rollers; and a dough hopper free from attachment to the base and the roller side frames engaging over the side frames to hold them in operative position and when removed enabling the machine to be disassembled by sliding the annular bearings of the roller frame off the bosses and lifting the cutting member and drive shaft out of their bearings.

5. A machine for forming tortillas and the like including: a base having vertical side plates extending in parallel relation, aligned bearing recesses provided in the top edges of the plates; aligned bearing bosses projecting laterally from said plates in the same direction, aligned bearing grooves being provided in the upper surfaces of said bosses and being open adjacent the top edge of the plates; a rotary cutting element supported in the bearing recesses in the top edges of the plates; a back roller frame having spaced side plates; a back roller mounted in said spaced side plates; annular bearings in said back roller frame side plates fitting upon the periphery of said bosses; a front roller frame having spaced side plates; a front roller supported in the front frame in operative engagement with the cutting element, the back and front rollers co-operating to roll out a sheet of dough and the cutting element dividing the sheet of dough while supported on the front roller; annular bearings in the front roller frame side plates fitting on the periphery of said bosses in side by side relation with the annular bearings of the back frame; a drive shaft mounted below said front roller in the bearing grooves in the bosses and retained therein by the annular bearings of the front and back roller frames, a belt roller secured to and driven by the drive shaft, horizontally arranged projecting ridges on the side plates of the base; arms slotted at their inner ends to fit over the forward edge of the side plates and be positioned on the base sides by said ridges; a cylindrical member mounted between the projecting ends of the arms; an endless conveyor belt riding on said belt roller and cylindrical member; thumb screws arranged to move said arms forwardly on the base plates to tension the conveyor belt and to permit said arms to be slacked back to loosen the belt; means for rotating said drive shaft; gearing driven by said drive shaft and effective to rotate said cutter member and rollers in timed relation; and a dough hopper free from attachment to the base and the roller side frames engaging over the side frames to hold them in operative position and when removed enabling the machine to be disassembled.

6. A machine as set forth in claim 5, and in addition comprising lugs projecting laterally from the side plates of the base, and channels provided in the inner ends of said arms to receive said lugs, whereby said arms are detachably secured on said side plates.

7. A machine for forming tortillas and the like, including: a base having vertical side plates extending in parallel relation, aligned bearing recesses provided in the top edges of the plates; aligned bearing bosses projecting laterally from said plates in the same direction, aligned bearing grooves being provided in the upper surfaces of said bosses and opening through the top edge of the plates; a rotary cutting element supported in the bearing recesses in the top edges of the plates; a back roller frame having spaced side plates; a back roller mounted in said spaced side plates; annular bearings in said back roller frame side plates fitting upon the periphery of said bosses; a front roller frame having spaced side plates; a front roller supported in the front frame in operative engagement with the cutting element and being effective to prevent the cutter from leaving its bearings, the back and front rollers co-operating to roll out a sheet of dough and the cutting element dividing the sheet of dough while supported on the front roller; annular bearings in the front roller frame side plates fitting on the periphery of said bosses in side by side relation with the annular bearings of the back frame; a drive shaft mounted below said front roller in the bearing grooves in the bosses and retained therein by the annular bearings of the front and back roller frames; means for rotating said drive shaft; gearing driven by said shaft to rotate said cutter and rollers; a dough hopper free from attachment to the base and the roller side frames engaging over the side frames to hold them in operative position and when removed enabling the machine to be readily disassembled by sliding the annular bearings of the roller frames off the bosses and lifting the cutting member and drive shaft out of their bearings; abutments projecting from the side plates of the base; and adjustable members mounted on the front roller frame and engaging against said abutments to adjustably limit the rotation of the front roller frame about the bearing bosses.

8. A machine for forming tortillas and the like, including: a base having vertical side plates extending in parallel relation, aligned bearing recesses provided in the top edges of the plates; aligned bearing bosses projecting laterally from said plates in the same direction, aligned bearing grooves being provided in the upper surfaces of said bosses and opening through the top edge of the plates; a rotary cutting element supported in the bearing recesses in the top edges of the plates; a back roller frame having spaced side plates; a back roller mounted in said spaced side plates; annular bearings in said back roller frame side plates fitting upon the periphery of said bosses; a front roller frame having spaced side plates; a front roller supported in the front frame in operative engagement with the cutting element and being effective to prevent the cutter from leaving its bearings, the back and front rollers co-operating to roll out a sheet of dough and the cutting element dividing the sheet of dough while supported on the front roller; annular bearings in the front roller frame side plates fitting on the periphery of said bosses in side by side relation with the annular bearings of the back frame, the annular bearings of the front and back roller frames both being provided with a gap in the periphery thereof; a radially projecting lug at the outer end of the laterally projecting bearing boss holding the frames against axial movement thereon until the gap in said annular bearings is aligned with the lug; a drive shaft mounted below said front roller in the bearing grooves in the bosses and retained therein by the annular bearings of the front and back roller frames; means for rotating said drive shaft; gearing driven by said shaft to rotate said cutter and rollers; a dough hopper free from attachment to the base and the roller side frames engaging over the side frames to hold them in operative position and when removed enabling the machine to be readily disassembled by sliding the annular bearings of the roller frames off the bosses and lifting the cutting member and drive shaft out of their bearings; abutments projecting from the side plates of the base; and adjustable members mounted on the front roller frame and engaging against abutments to adjustably limit the rotation of the front roller frame about the bearing bosses.

9. A machine for forming tortillas and the like, including: a base having aligned bearings therein open for a portion of their periphery; a rotary cutter member supported in said bearings; a first dough roller mounting means having a frame removably mounted on said base and a first dough roller mounted in said frame; a second dough roller mounting means having a frame removably mounted on said base and a second dough roller mounted in said second frame and cooperating with the first dough roller to roll out a sheet of dough and bearing against the cutting element of the cutter member and retaining the latter in its bearings; a second pair of aligned bearings in said base; a drive shaft mounted in said second pair of bearings and retained therein by engagement with said second frame while the latter is in operative position; means for driving said cutter member and first and second rolls at predetermined speed from said drive shaft; upward extensions of said front and back roller frames; a dough hopper free from attachment to the base and the roller frames positioned over said extensions and supported on said rollers; and adjustable means mounted on said hopper and engaging against the upward extension of one of said frames whereby the spacing of the rollers from one another may be adjusted and the hopper may be lifted off the frames to release the frames with the rollers mounted therein, the cutter member, and the drive shaft, from the base without the use of tools.

ARMANDO J. PEREYRA.

References Cited in the file of this patent
UNITED STATES PATENTS

| Number | Name | Date |
|---|---|---|
| 970,370 | Green | Sept. 13, 1910 |
| 1,763,445 | Romero | June 10, 1930 |